United States Patent [19]

Jehly et al.

[11] 3,795,151
[45] Mar. 5, 1974

[54] ELECTROMAGNETIC COUPLING FOR AN ALTIMETER

[75] Inventors: Lynn C. Jehly; Carl E. Johanson, both of Davenport, Iowa

[73] Assignee: The Bendix Corporation, South Bend, Ind.

[22] Filed: Aug. 18, 1972

[21] Appl. No.: 281,893

[52] U.S. Cl. ................................................. 73/387
[51] Int. Cl. ............................................. G01l 7/14
[58] Field of Search ............... 73/386, 387; 318/254

[56] References Cited
UNITED STATES PATENTS
3,715,926  2/1973  Hedrick ................................ 73/387

*Primary Examiner*—Donald O. Woodiel
*Attorney, Agent, or Firm*—Leo H. McCormick, Jr.; William N. Antonis

[57] ABSTRACT

A synchronizer for coupling a corrective servo mechanism to a pneumatic altitude sensor in an aircraft to provide a display with a positive pressure altitude indication. The synchronizer has a first rotor retained on a shaft with gear teeth that are positively engaged with the servomotor. The synchronizer has a second rotor concentric to said first rotor with gear teeth that positively engage the altitude sensor. A coil in the synchronizer is energized and lines of magnetic flux developed which pass through poles in the first and second rotor. An altitude computing device connected to the altitude sensor computes an electrical error signal which activates the servomotor. With the servomotor activated the first rotor is moved. The magnetic attraction between the poles correspondingly causes the second rotor to move and exert a modifying force on the output from the altitude sensor to establish the true pressure altitude output for operating an indicator.

10 Claims, 7 Drawing Figures

ELECTROMAGNETIC COUPLING FOR AN ALTIMETER

BACKGROUND OF THE INVENTION

Altitude detectors, such as those shown in U. S. Pat. Nos. 3,083,575 and 3,304,782, incorporated herein by reference for use in aircraft, receive corrective error signal information derived from a computer for modifying a pneumatic input to develop a positive pressure altitude. The corrective error signal is transmitted to an indicator shaft through a clutch which can be activated by an electromagnet or by a positively engaged spring. However, such physical-mechanical connections are subjected to material fatigue which could result in faulty transmission of the corrective error signal to the indicator shaft. Further in the event of an electrical failure, the altitude pneumatic input must drive at least a portion of the mechanical clutch resulting in a mechanical drag on the indicator shaft. This mechanical drag could produce an error in the indicated altitude of several hundred feet.

SUMMARY OF THE INVENTION

We have developed a pressure sensor for use in an aircraft wherein the frictional drag resulting from a corrective servomotor is eliminated in the event of an electrical power failure. An electromagnetic coupling means is inserted between the servomotor and the altitude sensing means. The altitude input from the sensing means is relayed into a shaft. A display means is associated with the shaft to give a visual indication of this sensed altitude. This sensed altitude is also communicated from an altitude computing means wherein a signal for the aircraft at that particular altitude is computed to establish a true pressure altitude electrical signal. Rotor sensing means connected to the shaft will sense the true pressure altitude electrical signal from the altitude computing means and will also sense the rotation of the shaft by the altitude sensor. The rotor sensing means in response to a non-equilibrium condition between the true pressure altitude electrical signal and the rotative force on the shaft will establish a corrective electrical signal. The corrective electrical signal will be transferred to the corrective servomotor for rotating a first rotor in the magnetic coupling. As the first rotor rotates, magnetic flux lines are disrupted causing a second rotor connected to the shaft from the altitude sensor to correspondingly move through magnetic attraction. The magnetic attraction can be adjusted accordingly to assure that the maximum torque between the servomotor and the shaft will not affect the altitude sensor means, by varying an electrical current supplied to a coil for developing the magnetic attraction. In the event that the source of electrical energy in the aircraft is interrupted, switching means will immediately supply a pulsing current through the coil to eliminate any residual magnetism in the coupling means. This will completely disconnect the corrective servomotor from the shaft. Thus, only the altitude sensor will be acting on the shaft without any additional drag to interfere with the indicated altitude of the aircraft.

It is therefore the object of this invention to provide coupling means for joining a corrective servomotor with an operational shaft to supply a biasing force on an altitude sensor to establish a true pressure altitude indication.

It is another object of this invention to provide a magnetic coupling with means for varying the maximum torque transferred from a servomotor to a rotatable shaft.

It is still a further object of this invention to provide an electromagnetic coupling with means for removing residual magnetism upon interruption of electrical energy to thereby eliminate any frictional drag upon sensor means supplying an output to an indicator displaying a sensed altitude.

It is still a further object of this invention to provide an altimeter with means for switching from a communicated electrical condition to a pneumatic condition wherein an altitude pressure sensor controls the indicated altitude on a display.

These and other objects will become readily apparent to those who read this specification and view the drawings.

DETAILED DESCRIPTION OF THE PREFERRED EMBODIMENT

Figure 1:
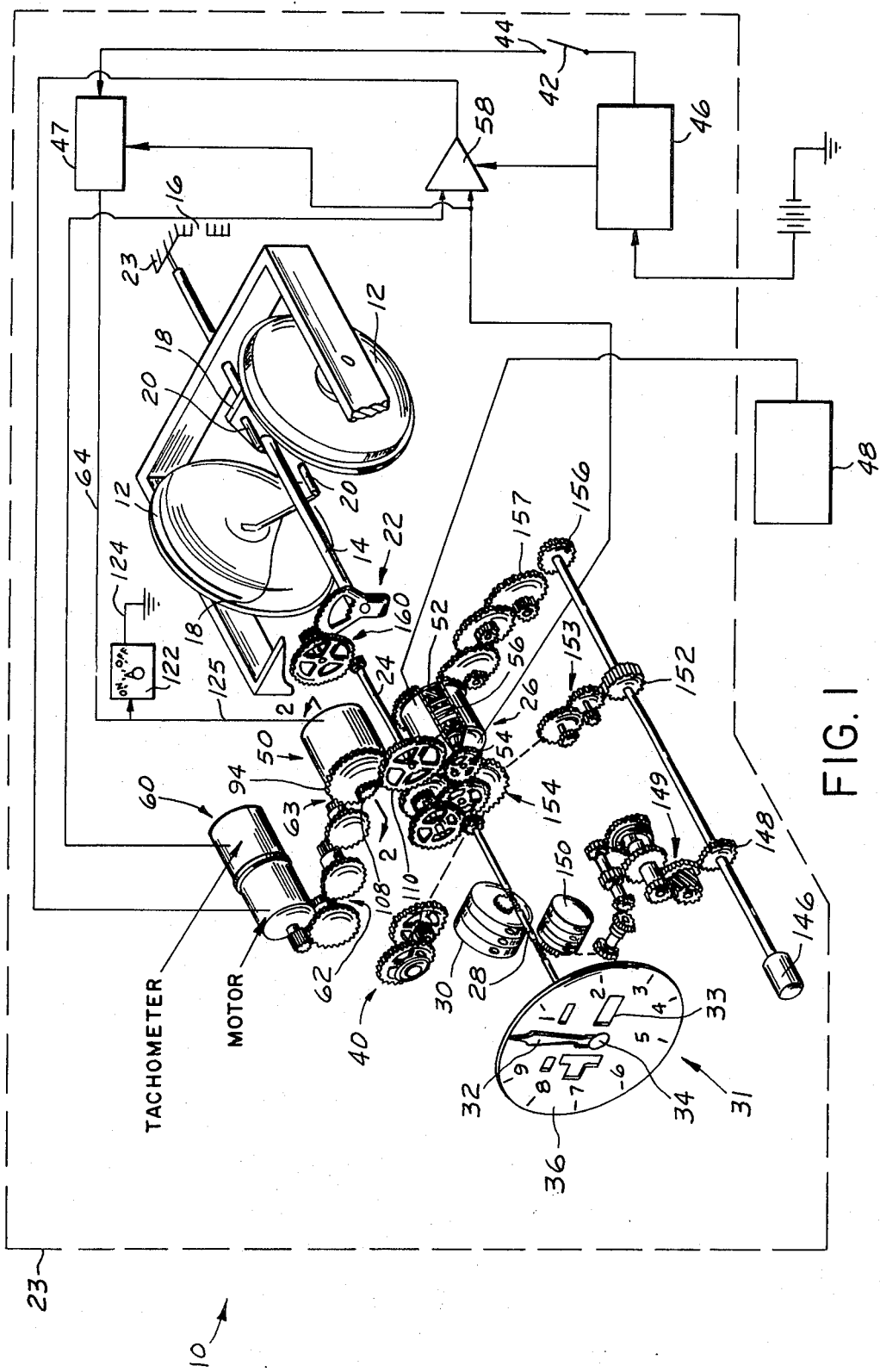
FIG. 1 is a perspective view of an altimeter embodying an electro-magnetic coupling means for joining a corrective servomotor to a shaft from an altitude sensor to provide a true pressure altitude readout on an indicator.

The altimeter means 10, shown in FIG. 1 which indicates an elevation of an aircraft above sea level, has been developed to permit a complete change from a servo mode to a pneumatic mode upon breaking of an electrical current switch 42. In the pneumatic mode, two aneroids 12 symmetrically mounted on a common rocking shaft 14 are retained in housing 23. The aneroids 12 expand and contract in relation to the static pressure received from the static tube 16 of an aircraft. As the aneroids 12 contract and expand, arms 18 act on temperature compensating means 20 to convert this deflection into rotary movement of shaft 14. The temperature compensating means 20 includes bi-metallic elements which automatically correct the corresponding rotation of the shaft over the range of temperature that an aircraft will experience at ground to a selected flight elevation.

The rotation of shaft 14 is multiplied by a sector gear means 22 to rotate input shaft 24. The rotation of input shaft 24 is transmitted through rotary means 26 to an output shaft 28. A pointer 32 attached to the end 34 of the output shaft 28 overlies scale 36. One complete rotation of pointer 32 indicates a thousand foot rise in elevation. A counter 30 is connected to the output shaft and records the rotation to indicate the elevation above sea level as a function of this rotation.

To avoid backlash in the drive shafts when a rapid change in elevation as sensed by the aneroids occurs, a hair spring means 40 places a predetermined constant load on all the meshes in the gear train.

When it is desired that the altimeter means 10 be placed in the servo mode, switch 42 is moved to contact point 44 allowing electrical current from source 46 to be communicated to an altitude computing means 48. The altitude computing means 48 is a computer wherein the static pressure, Mach number, temperature, mechanical linkages, error characteristics of the aneroids 12, which will normally increase with a corresponding increase in altitude, inherent static pressure defects of the aircraft, which normally decrease with a corresponding increase in altitude, etc., are evaluated and a true pressure altitude is computed. The altitude computing means 48 modifies the sensed flight condition signal with the computed error signal to produce a true pressure altitude electrical signal. This true pressure altitude electrical signal is transferred to coil 52 of the rotary sensing means 26. With coil 52 receiving the true pressure altitude electrical signal, magnetic lines of flux are created in the stator 56 which establish an equilibrium position for rotor 54. When the aneroids or pressure responsive means 12 cause rotor 54 to be at a position other than the equilibrium point, the difference between these two positions of rotor 54 will be transformed into a corrective electrical signal and communicated to an amplifier means 58. The amplifier means 58 in turn supplies an operational electrical signal for energizing the servomotor means 60. With servomotor means 60 energized, gear train 62 will rotate outer rotor means 63, see FIG. 2, of the electromagnetic coupling means 50.

Figure 2:
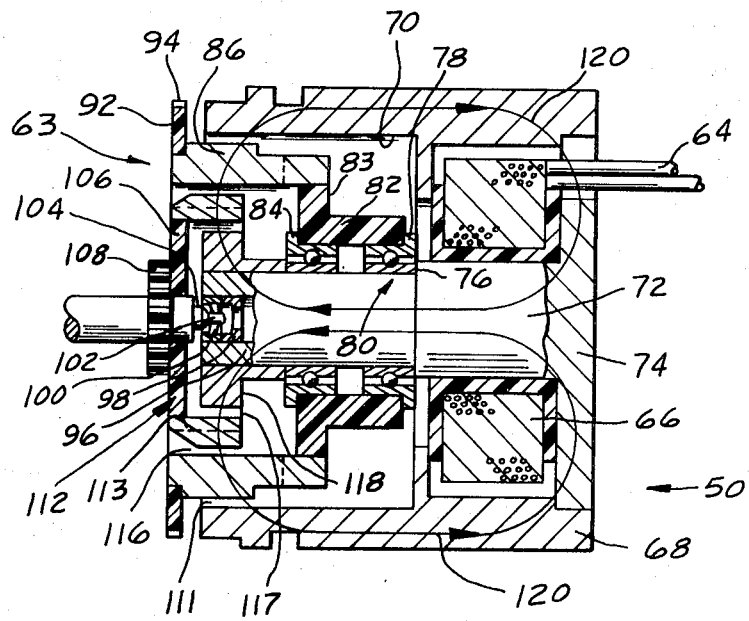
FIG. 2 is a sectional view taken along line 2—2 of FIG. 1 showing the electromagnetic coupling means.
Figure 3:
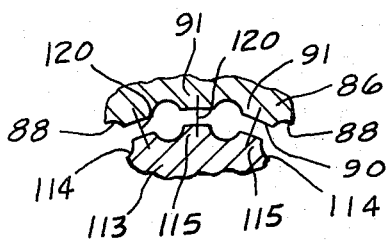
FIG. 3 is a sectional view taken along line A—A of FIG. 2 with the corrective servomotor in an inactivated condition.
Figure 4:
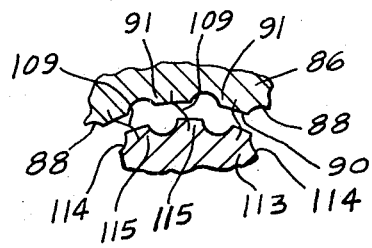
FIG. 4 is a sectional view taken along line A—A of FIG. 2 with the corrective servomotor energized.
Figure 6:
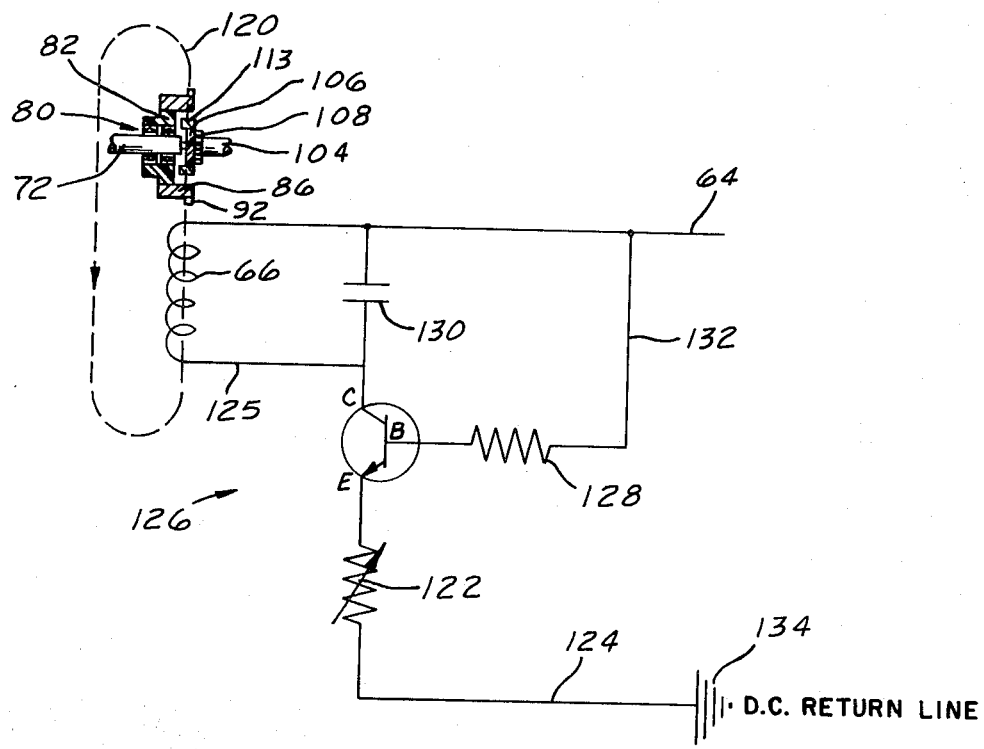
FIG. 6 is an electrical circuit diagram for demagnetizing the electromagnetic coupling upon interruption of electrical energy thereto.

Simultaneously with the closing of switch 42, electrical current is carried on lead line 64 to energize annular coil 66, see FIGS. 2 and 6, of the electromagnetic means 50 retained in the cylindrical housing 68. The cylindrical housing 68 has a blind bore 70 with a centrally located stem 72 extending from base 74. The stem 72 has a shoulder 76 for positioning race 78 of roller bearing means 80. A non-magnetic sleeve 82 has a shoulder 83 extending at a right angle from the central axis of the stem 72 and is held in a fixed position with respect to the roller bearing means by retainer 84. The outer rotor means 62 formed of a cylinder 86 of magnetic material which has a series of notches 88, see FIGS. 3 and 4, cut along the inner periphery 90 to establish poles 91 thereon, is attached to the shoulder 83. A plate 92 of non-magnetic material has a series of teeth 94 and is secured to the cylinder 86 for engagement with the gear train 62.

The stem 72 has a recess 96 along the central axis thereof into which an annular cup 98 is secured. A jewel bearing 100 is pressed into cup 98 for retaining one end 102 of axle 104, while the other end, not shown, is similarly retained in the housing 22. A plate 106 of non-magnetic material is secured to the axle 104 adjacent gear 108 which engages gear 110 on the end of shaft means 24. An inner rotor means 112, formed of a cylinder 113 of magnetic material has a series of notches 114, see FIGS. 3 and 4, cut along the external periphery to establish poles 115 thereof, is secured to plate 106. The inner rotor means 112 and the outer rotor means 63 are concentrically located within the bore 70 so that air gaps 111, 116, 117 between the cylinder 86 and the housing 68, between the cylinders 86 and 113 and between the rotor means 112 and the end plate 118 are substantially uniform. The substantially uniform air gaps 111, 116 and 117 will allow the lines of magnetic flux 120 created when coil 66 is energized to flow along a magnetic guide path through the stem 72 into the end plate 118, across air gap 117, into the cylinder 113, across air gap 116, into the cylinder 86, across air gap 111, into the cylindrical housing 86, back through the end plate back 114 and into the stem 72. The magnetic flux lines 120 will tend to align poles 91 with poles 115. The strength of the lines of magnetic flux can be adjusted by the variable resistor 122 in the return line 124, see FIG. 6. By adjusting the variable resistor 122, the total amount of current in the operational circuit 125, that also includes the resistance in the coil 66 and the transistor means 126, can be varied even though the input voltage remains constant. The current in line 64 that flows into circuit 132 will pass through resistor 128 to switch the NPN transistor 126 On and allow the current to flow in circuit 125, past the transistor 126, and through variable resistor 122 to ground 134. The resistor 128 is chosen so that the current flow in circuit 132 to the Base B of the transistor 126 is within a safe limit since excessive Base B to emitter E flow would cause the creation of prohibitive thermal energy.

Upon a corrective electrical signal being transmitted to the servomotor 60, which causes rotation in the gear train 62, the cylinder 86 of the outer rotor means 63 will correspondingly be moved. Since poles 91 on the outer cylinder 86 are magnetically attracted to the poles 115 on the inner cylinder 113, the inner rotor means 112 will correspondingly also be moved. The cylinder 113 will follow the movement of cylinder 86 until the torque restraining either of the rotors 63 and 112 exceeds that provided by the strength of the magnetic field or flux lines 120, see FIG. 4. The strength of the flux lines 120 will be determined by the selected value of the variable resistor 122. When this limit is reached, the rotors will begin to slip relative to each other, see FIG. 4.

Figure 5:
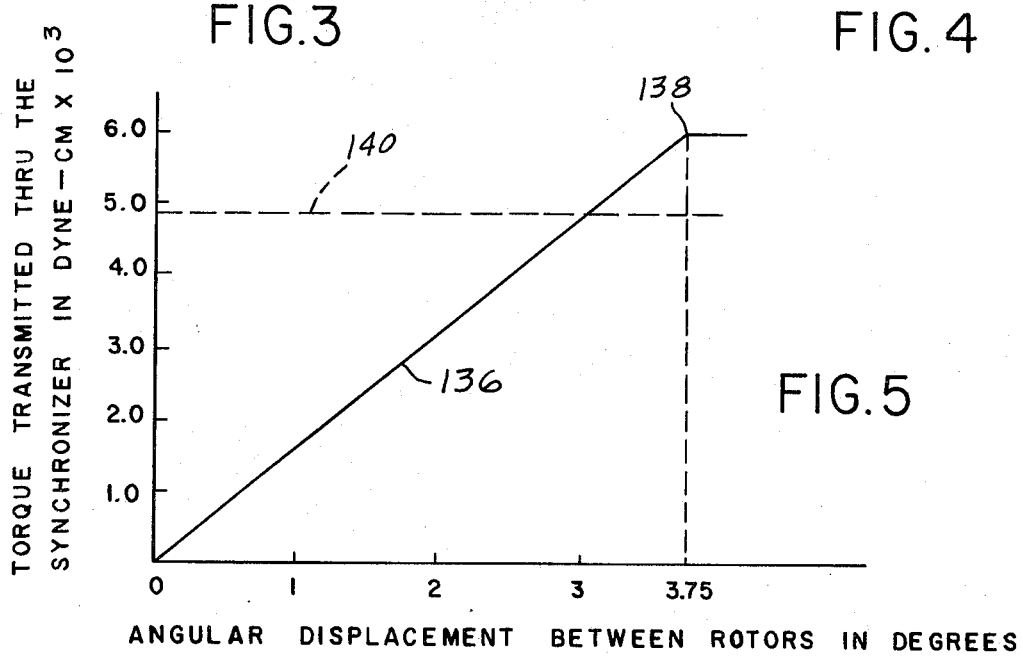
FIG. 5 is a graph showing the torque transferrable through the electromagnetic coupling means of FIG. 2.

In FIG. 5 it will be seen that annular displacement between the rotors required to provide a torque for biasing the gear 110 into an electrical balancing position for the rotary means 26, will vary according to line 136 up to a point 138. The magnetic flux lines or attraction having been limited by the variable resistor 122 so that at a force level below that which could damage the pressure sensor means 12, the rotors will slip with respect to one another. From experimentation it has been determined that a torque of about $4.8$ dyne-cm $\times 10^3$, as illustrated by line 140, is necessary to provide 2,000 feet of offset at sea level, which is well below the point 138, the limit of the maximum available torque where slippage would occur.

When gear 108 acts on gear 110 to override the rotary force of the pressure responsive means 12 on shaft 14, an electrical balance will be created in the rotary sensing means 26. When the electrical balance is achieved, a holding electrical signal will be supplied the servomotor 60 to maintain the gear train 62 in an equilibrium condition. With gear train 62 stationary, a magnetic flux 120 similar to that shown in FIG. 4 will maintain the poles 91 and 115 together to provide a constant bias force on gear 110 through gear 108. In the balanced condition, the indicator will be positioned to provide a true pressure altitude reading in the display means 36.

Figure 7:
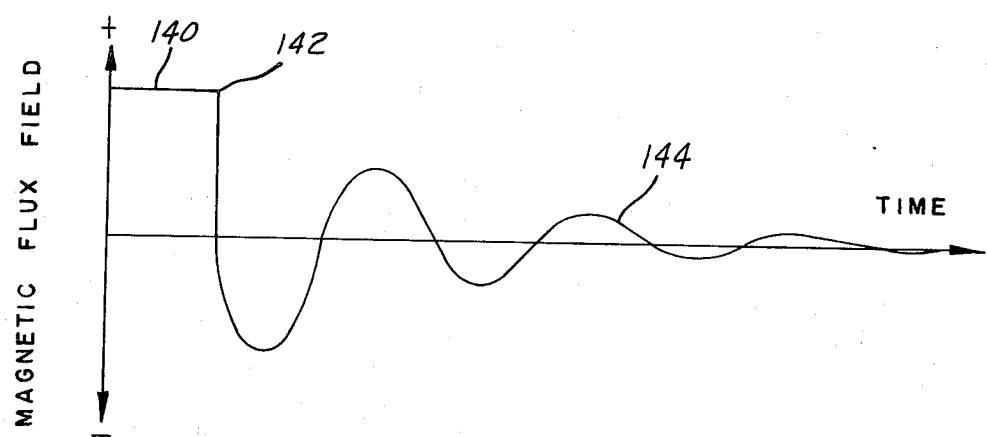
FIG. 7 is a schematic showing the elimination of residual magnetism in the electromagnetic coupling through the electrical circuit of FIG. 6.

In the event that the electrical current from source 46 is interrupted either by opening switch 42 or through a power failure, the residual magnetism which could develop in the coupling means 50 is eliminated. Immediately upon interruption of the current in line 64, the flow through circuit 132 to the Base B of the NPN transistor is terminated preventing current flow therethrough. The electrical current stored in capacitor 130 when switch 42 is closed, will reach a level equal to that which energizes coil 66 and could graphically be illustrated as a horizontal line 140 in FIG. 7. Immediately when the electrical current is removed from line 64, the current in capacitor 130 is forced into coil 66 in an attempt to maintain a balance across the capacitor 130. However, by the time this current reaches the positive side of the capacitor 130 due to internal losses, an unbalance is again created causing a reversal of the current. The internal resistance losses in circuit 125 from the time the transistor is switched off at point 142 will systematically eliminate the residual flux as shown by line 144 until zero voltage is present. Because of this dampening of the voltage present in the capacitor, magnetic field created by the coil 66 will follow a directly proportional curve (X), not shown, exactly like 144. Because of this damped reversing or damped oscillation in the magnetic field, residual magnetism present between the outer rotor disc 86 and inner rotor disc 113 is also reduced to zero.

Without the magnetic attraction between the inner rotor means 112 and outer rotor means 86, the servomotor 60 is disengaged from the shaft 24 allowing the pressure responsive means 12 alone to operate the elevation indicating display means 31. Additionally, when the corrective electrical signal which activates the amplifier means 58 reaches a predetermined level, failsafe means 47 is activated interrupting the electrical current carried in line 64 to the electromagnetic means 50. Without current in line 64, the aneroids 12 alone will position the shaft in the manner described above to provide uncorrected pressure altitude to be displayed.

Initially upon an operator entering the aircraft, the indicated output of the altimeter will need to be modified for existing ground level pressure. This modification is achieved through adjusting knob 146. The adjusting knob 146 is connected to three separate gears 148, 152 and 156 through which the barometric information is transmitted to manually change the output in the display means 31. Gear 148 is adapted to engage gear train 149 to position barometric counter 150 and provide a visual indication through window 33 of the display means 31. Gear 152 is adapted to engage non-linear gear train 153 to operate the barometric scale counter 154 to provide a summation of the servo position and the barometric correction.

Gear 156 is adapted to engage gear train 157 to position rotary sensing means 26 to correspondingly adjust the rotor 54. Not all the gears 148, 152 and 156 are simultaneously engaged with their respective gear trains but will be selectively engaged according to the following four modes of operation.

Mode No. 1 stand by at ground elevation where the barometric pressure reading is transmitted to the altimeter only gears 148 and 152 engage the respective gear trains 149 and 153;

Mode No. 2 servoed position created by closing switch 42 to supply electrical current to the servomotor 60, rotor sensor 26 and electromagnetic coupling 50, adjustment knob is moved so only gear 152 engages gear train 153;

Mode No 3 electrical setting, knob 146 is pushed forward so that gear 152 engages train 153 and gear 156 engages 157; and Mode No. 4 mechanical setting, knob 146 is disposed rearwardly so that only gear 148 engages gear train 149 allowing the reset and the barometric counter 150 as when the aircraft has travelled to an area having a different weather condition.

From the above is can readily be seen that the coupling means 50 functions as a non-engagement type clutch which is activated through an electrical current to magnetically join a corrective servomotor 60 with a rotary sensor 26 and position an indicator to give true pressure altitude indication. When the coupling means 50 is deactivated, a demagnetizing means in circuit 125 eliminates any residual magnetism in the coupling means 50 to disengage the servomotor means 60.

We claim:

1. A pressure sensor for use in an aircraft which gives a visual indication of sensed flight conditions, comprising:

a housing;

shaft means retained by a bearing wall within said housing;

pressure responsive means connected to said shaft means for proportionally rotating said shaft in response to sensed flight conditions to produce a corresponding pressure altitude signal;

display means associated with said shaft means for exhibiting an altitude representative of said altitude signal;

altitude computing means for computing a true pressure altitude signal for said aircraft;

rotary means connected to said shaft and said altitude computing means, said rotary sensing means comparing said true pressure altitude signal and said pressure altitude signal to establish a corrective electrical signal;

servomotor means responsive to said corrective electrical signal; and coupling means driven by lines of magnetic flux for biasing said shaft into a rotary position to produce an electrical balance condition in said sensing rotary means, said coupling means limiting the maximum rotary torque transferable from said servomotor to said shaft to prevent damaging said pressure responsive means when said corrective electrical signal exceeds a predetermined torque.

2. The pressure sensor, as recited in claim 1, wherein said coupling means include:

first gear means connected to said shaft, said first gear having an axle retained in said housing through a substantially frictionless bearing;

second gear means connected to said servomotor; and electromagnetic means responsive to an electrical current for establishing said magnetic flux, said magnetic flux passing through said first and second gear means, said servomotor upon receiving said corrective electrical signal rotating said second gear means, said flux lines causing said first gear menas to follow the rotation of the second gear means through a magnetic attraction and exert a biasing rotative force on said shaft to create said electrical balancing condition in said sensing rotary means.

3. The pressure sensor, as recited in claim 2, wherein said electromagnetic means includes:
a cylindrical housing having a bore therein with a centrally located stem extending from the bottom of the bore; and
an annular coil located in said bore and surrounding said stem, said flux lines following a path from the stem through said first and second gear means into the cylindrical housing.

4. The pressure sensor, as recited in claim 3, wherein said electromagnetic means further includes:
adjusting means connected to said annular coil for varying said electrical current to limit the rotary torque from said servomotor.

5. The pressure sensor, as recited in claim 4, wherein pressure sensor further includes:
switching means connected to said altitude computing device means, rotary means, servomotor means and coupling means for interrupting electrical communication therebetween allowing said pressure responsive means to establish complete control of said display means.

6. The pressure sensor, as recited in claim 5, wherein said adjusting means includes:
circuit means connected to said annular coil for eliminating residual magnetism in said coupling means when said electrical communication is interrupted to reduce said magnetic flux from affecting the rotation of said shaft by the pressure responsive means.

7. The pressure sensor as recited in claim 6, wherein said second gear means includes:
a sleeve of non-magnetic material mounted on a bearing positioned on said stem adjacent said coil, said sleeve having a shoulder on an end away from said coil;
a first cylinder of magnetic material secured to said shoulder having a series of notches adjacent the interior periphery thereof to form poles thereon through which the lines of magnetic flux are transmitted; and
a first plate of non-magnetic material secured to said disc having a series of teeth thereon for engagement with said servomotor.

8. The pressure sensor, as recited in claim 7, wherein said first gear means includes:
a second plate of non-magnetic material secured to said axle; and
a second cylinder secured to said second plate having a series of notches adjacent the exterior periphery thereof to form poles thereon through which said lines of magnetic flux are transmitted; and
a second plate having a series of teeth thereon for engagement with said shaft means which is connected to said pressure responsive means.

9. The pressure sensor, as recited in claim 1, wherein said coupling means includes:
a cylindrical housing having a bore therein with a centrally located stem extending from the bottom of the bore;
first gear means connected to said shaft, said first gear having an axle retained in said housing through a substantially frictionless bearing;
second gear means connected to said servomotor;
an annular coil located in said fluid bore and surrounding said stem, said annular coil being connected to a source of electrical current;
electromagnetic means responsive to said electrical current for establishing magnetic flux lines that follow a path from the stem through said first and second gear means into the cylindrical housing, said servomotor upon receiving said corrective rotating said second gear means, said magnetic flux lines causing said first gear means to follow the rotation of the second gear means through a magnetic attraction and exert a biasing rotative force on said shaft to create said electrical balancing condition in said sensing rotary means;
adjusting means connected to said annular coil for varying said electrical current to limit the rotary torque from said servomotor;
switching means connected to said altitude computing means, rotary means, servomotor means and coupling means for interrupting electrical communication therebetween allowing said pressure responsive means complete control of said display means; and
circuit means connected to said annular coil for eliminating residual magnetism in said coupling means when said electrical communication is interrupted to reduce frictional drag from affecting the rotation of said shaft by the pressure responsive means.

10. A pressure sensor for use in an aircraft which gives a visual indication of sensed flight conditions, comprising:
a housing;
shaft means retained by a bearing wall within said housing;
pressure responsive means connected to said shaft means for proportionally rotating said shaft in response to sensed flight conditions to produce a corresponding pressure altitude signal;
display means associated with said shaft means for exhibiting an altitude representative of said altitude signal;
altitude computing means for computing an error signal from the static pressure defects in said aircraft, said error signal modifying said pressure altitude signal to produce a true pressure altitude electrical signal from said sensed flight conditions;
rotary means connected to said shaft and said altitude computing means, said true pressure altitude electrical signal energizing said rotary sensing means to produce a force opposing the rotation of said shaft by said pressure responsive means, said rotary means sensing said opposing force to produce a corrective electrical signal;
servomotor means responsive to said corrective electrical signal; and
coupling means located between said servomotor and said shaft and controlled by magnetic flux lines for biasing said shaft into a rotary position to produce an electrical balance condition in said sensing rotary means, said coupling means limiting the maximum rotary torque transferable from said servomotor to said shaft to prevent damaging said pressure responsive means when said corrective electrical signal exceeds a predetermined angular torque.

* * * * *